United States Patent [19]

Marwitz

[11] 4,118,073

[45] Oct. 3, 1978

[54] CAST SPOKE-WHEEL FOR MOTOR VEHICLES, ESPECIALLY MOTORCYCLES

[75] Inventor: Hans-Günther v.d. Marwitz, Münich, Germany

[73] Assignee: Bayerische Motoren Werke AG, Germany

[21] Appl. No.: 710,395

[22] Filed: Aug. 2, 1976

[30] Foreign Application Priority Data

Aug. 2, 1975 [DE] Fed. Rep. of Germany ....... 7524641

[51] Int. Cl.² .......................... B60B 1/08; B60T 5/00
[52] U.S. Cl. ................... 301/6 CS; 301/6 V; 301/65
[58] Field of Search .............. 301/6 R, 6 A, 6 LS, 301/6 CF, 6 E, 6 V, 63 R, 64 R, 64.5 D, 65, 79; 188/218 R, 264 R, 264 A, 264 AA

[56] References Cited

U.S. PATENT DOCUMENTS

| 1,566,344 | 12/1925 | Perrot et al. | 301/65 |
| 1,936,725 | 11/1933 | Miller | 188/218 R |
| 1,957,654 | 5/1934 | La Brie | 188/264 R |
| 1,964,129 | 6/1934 | Miller | 301/65 |
| 2,237,164 | 4/1941 | Rosenberg | 301/6 CS |

FOREIGN PATENT DOCUMENTS

| 689,432 | 9/1930 | France | 188/264 R |
| 173,001 | 11/1952 | Fed. Rep. of Germany | 301/6 CS |

*Primary Examiner*—Robert B. Reeves
*Assistant Examiner*—H. Grant Skaggs
*Attorney, Agent, or Firm*—Craig & Antonelli

[57] ABSTRACT

A cast spoke-wheel for motorcycles, with a brake hub connected with a wheel hub by way of an end wall; spokes or spokes with webs reinforcing the same in the axial direction are arranged extending over the end wall whereby air feed devices for ventilating the brake hub are arranged between the spokes or between the webs within the area of the end wall.

2 Claims, 3 Drawing Figures

CAST SPOKE-WHEEL FOR MOTOR VEHICLES, ESPECIALLY MOTORCYCLES

The present invention relates to a cast spoked wheel for motor vehicles, especially for motorcycles, with a brake hub which is operatively connected with a wheel hub by way of an end wall.

It is the aim of the present invention to provide in a spoke-wheel of the aforementioned type, an arrangement of the air-feed installations connected with the respective wheel for producing an air stream for cooling brakes or brake hubs, which are known with disk-wheels as also with wire-spoke-wheels of motor vehicles.

According to a feature of the present invention, spokes or spokes with webs which reinforce in the axial direction, are arranged extending over the end wall of the brake hub whereby air feed devices for ventilating the brake hub are arranged between the spokes or between the webs within the area of the end wall.

A configuration of a cast spoke-wheel which is appealing from a styling and design point of view, can be achieved in an advantageous manner by the arrangement in accordance with the present invention. Furthermore, with a spoke-wheel constructed according to the present invention and provided as rear wheel in a motorcycle, the rear-wheel-brake can be considerably better ventilated in an advantageous manner for purposes of cooling than with the apertures arranged in a known manner in a brake carrier plate.

According to a further feature of the present invention, apertures are coordinated in the end wall to the air feed devices, by means of which an internal ventilation of the brake hub is attained in an advantageous manner.

For purposes of increasing the internal ventilation, it is additionally proposed according to one embodiment of the present invention that further apertures arranged within the area of a brake lining are provided in the end wall outside of the direct range of effectiveness of the air-feed devices, which simultaneously serve for the control of the brake lining wear.

A scavenging of the brake hub is achieved therewith which, in addition to an enhanced heat-removal, also produces in an advantageous manner a removal of the brake lining material abraded by wear.

In order to avoid that the inflowing and outflowing air streams interfere with one another, it is proposed according to another feature of the present invention that alternately an air feed device or an inspection hole is arranged between the spokes.

In realization of the present invention, obliquely positioned blades are provided as effective air feed devices, which project each in the axial direction beyond the spokes with their front edge pointing in the direction of rotation of the spoked wheel. In order to feed the air seized by the blades completely to the apertures in the end wall coordinated thereto, it is proposed according to a still further feature of the present invention that the blades are each operatively connected by way of their rear edge with an adjacent spoke and are connected on the side of the wheel hub as well as on the side of the wheel rim respectively with a wall extending between the spokes up to the end wall.

In this manner, a common or collecting space is coordinated to each blade downstream thereof whose walls contribute to a reinforcement of the spokes within the area of the brake- and wheel-hub.

Accordingly, it is an object of the present invention to provide cast spoke-wheels for motor vehicles, especially for motorcycles, which avoid by simple means the aforementioned shortcomings and drawbacks encountered in the prior art.

Another object of the present invention resides in cast spoked wheels for motorcycles which provide air feed devices for effectively ventilating the brake hub.

A further object of the present invention resides in a cast spoke-wheel for motorcycles which has a stylingly appealing configuration and shape.

A still further object of the present invention resides in a cast spoke-wheel for motor vehicles, in which an improved cooling is attainable, particularly of the rear wheels of motorcycles.

Another object of the present invention resides in a cast spoked wheel for motorcycles which attains advantageously an inner ventilation of the brake hub while at the same time assuring removal of particles stemming from brake-lining wear.

Still another object of the present invention resides in a cast spoke-wheel of the type described above which is simple, yet rugged in construction, permits an effective cooling of the brake hub and permits inspection of the wear of the brake lining.

These and other objects, features and advantages of the present invention will become more apparent from the following description when taken in connection with the accompanying drawing which shows, for purposes of illustration only, one embodiment in accordance with the present invention, and wherein.

Figure 1:
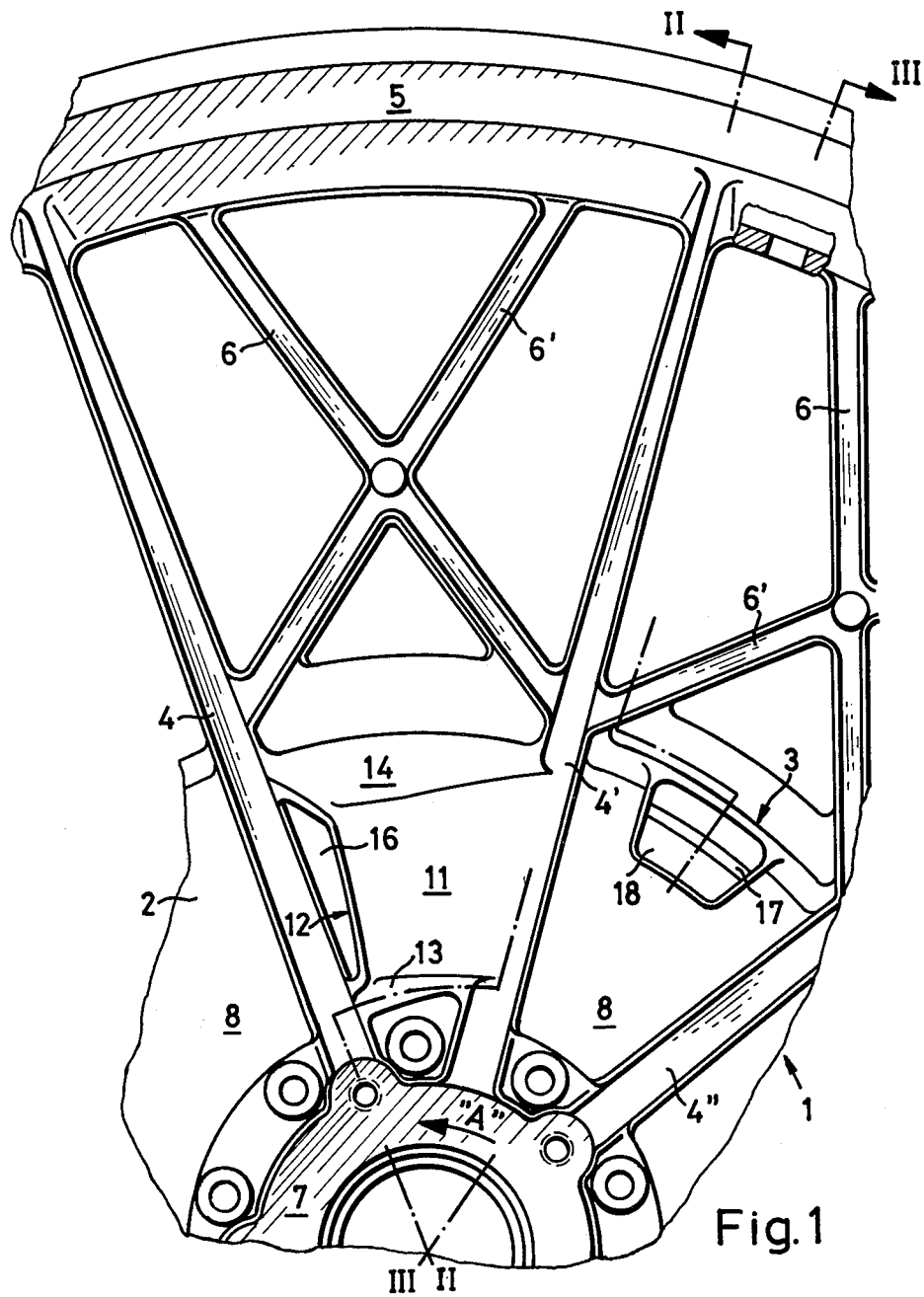
FIG. 1 is a partial elevational view of a spoke-wheel of cast construction in accordance with the present invention.

Referring now to the drawing wherein like reference numerals are used throughout the various views to designate like parts, the spoked wheel generally designated by reference numeral 1 which is of cast construction and is illustrated in FIG. 1 only partly, is equipped with a brake hub 2. Spokes 4, 4' and 4" extend from the drum 3 of the brake hub 2 in the radial direction toward a rim 5. The rim 5 receives an air tire (not shown). The radial spokes 4, 4' and 4" are constructed essentially rectangularly in their cross section. Their arrangement in the wheel 1 is made in such a manner that the radial spokes 4, 4' and 4" point with their wider side in the circumferential direction and therefore with their narrower side in the direction of the axis of rotation of the spoke-wheel 1. Additionally, support struts or braces 6, 6' which cross one another are arranged between the drum 3 and the rim 5 for the aforementioned radial spokes.

Figure 3:
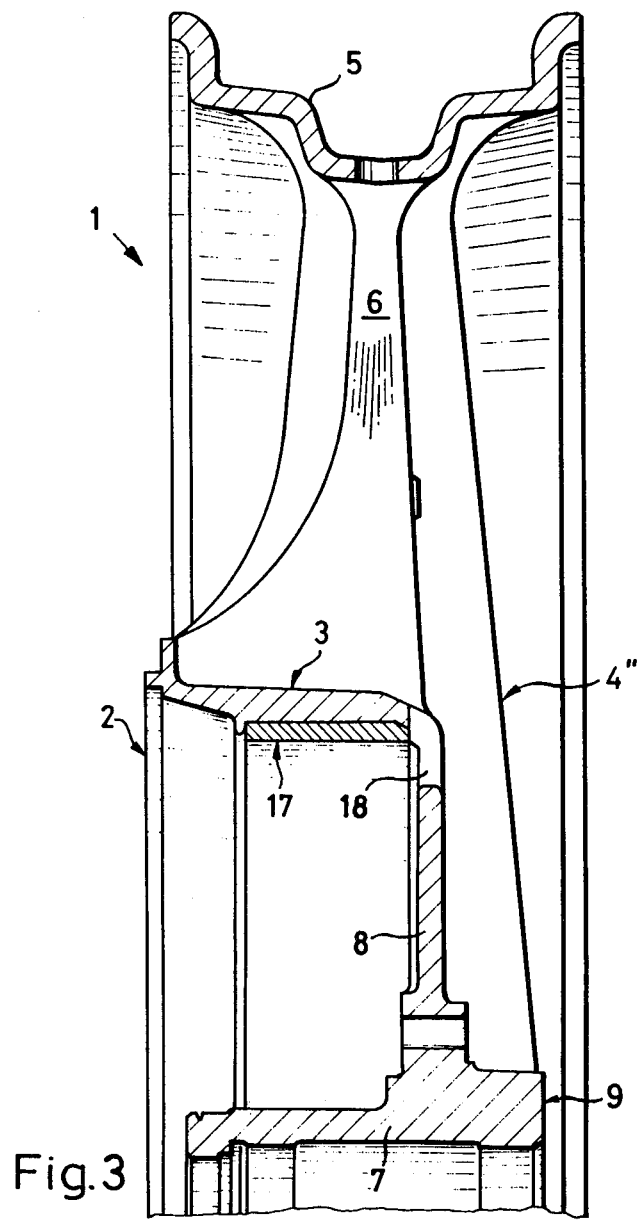
FIG. 3 is a partial cross-sectional view taken along line III—III of FIG. 1.

The brake hub 2 is operatively connected with a wheel hub 7 by way of an end wall 8. The end wall 8 is set back in the axial direction with respect to the end face 9 of the wheel hub 7 as shown in FIG. 3. As additionally shown in FIGS. 1 and 3, the radial spokes 4, 4' and 4" are constructed as extending beyond the drum 3 by way of the end wall 8 up to the wheel hub 7. The aforementioned radial spokes 4, 4' and 4" are connected in one-piece with the end wall 8 of the brake hub 2.

Figure 2:
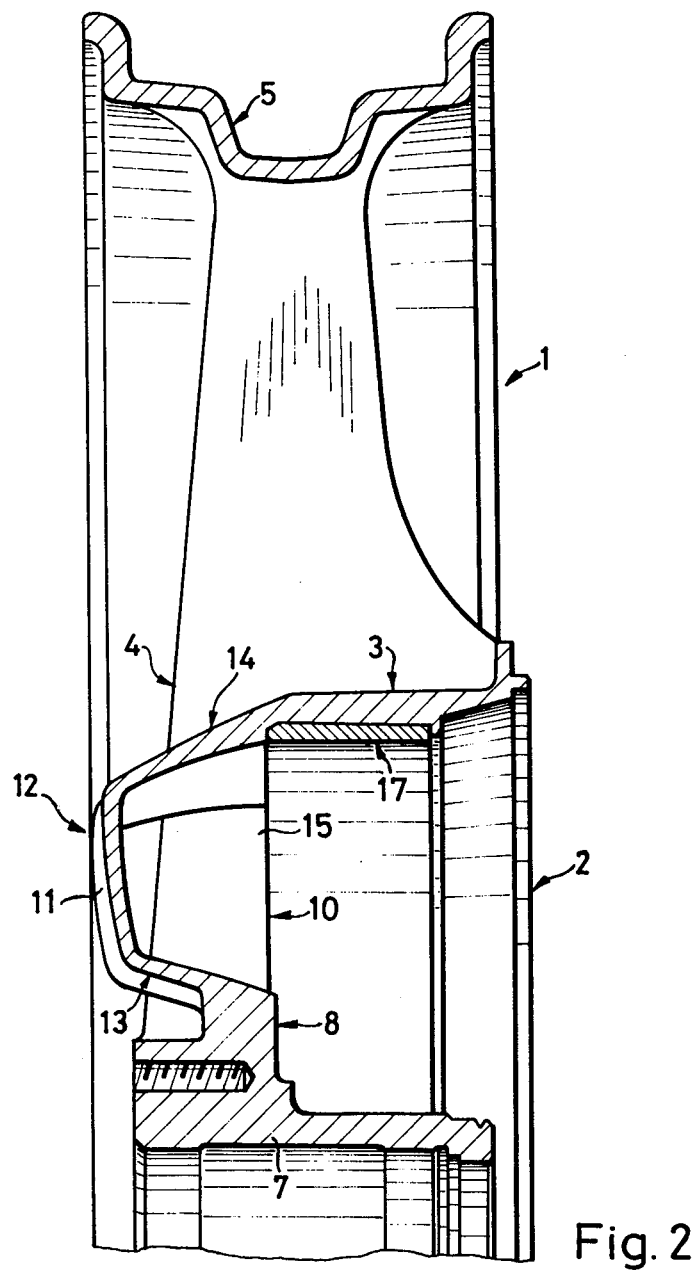
FIG. 2 is a partial cross-sectional view taken along line II—II of FIG. 1.

It can be seen from FIG. 2 that the end wall 8 is provided with an aperture 10. This aperture 10 is arranged between the radial spokes 4 and 4' in the end wall 8. For achieving an effective ventilation of the brake hub 2, an obliquely inclined blade 11 is connected ahead or upstream of the aperture 10 between the radial spokes 4 and 4' as an air-feed device. The blade 11 is positioned obliquely inclined in such a manner that it projects with its front edge 12 pointing in the direction of rotation (arrow "A") of the spoke wheel 1 in the axial direction beyond the spoke 4. This means that the blade 11 seizes air during the rotation of the spoke wheel 1 according to the arrow "A" and forces the same into the brake hub 2 by way of the aperture 10. In order to supply the seized air completely to the brake hub 2, the blade 11, on the one hand, is connected by way of its rear edge with the adjacent radial spoke 4'. On the other hand, the blade 11 is connected on the side of the wheel hub as well as on the side of the rim respectively with an end wall 13 and 14 (FIGS. 1 and 2) extending between the wheel spokes 4 and 4' up to the end wall 8.

With this construction an air-collecting scoop is formed within which an air-collecting space 15 is created between the radial spokes 4 and 4', into which flows the air by way of an inlet opening 16 (FIG. 1) delimited by the front edge 12 of the blade 11, by the radial spoke 4 and by the walls 13 and 14. From the air-collecting space 15, the air enters by way of the aperture 10 into the interior of the brake hub 2 and absorbs a part of the heat produced during the braking. Thus, inlet 16, space 14, and aperture 10 form an air-collecting scoop passage for supplying ventilating air through the end wall 8 to the interior of the brake hub 2.

The air flows out of the brake hub 2 by way of an aperture 18 arranged in the end wall 8 between the radial spokes 4' and 4". This aperture 18 is arranged as inspection hole for the control of the brake lining within the area of a brake lining (not shown) cooperating with a brake ring 17.

An alternate arrangement of blades 11 and inspection hole 18 between the radial spokes 4, 4' and 4" can be seen from FIG. 1. This alternate arrangement is made over the entire end wall 8 of the brake hub 2. A forceful scavenging of the brake hub 2 with air is achieved with this arrangement during the rotation of the spoke-wheel 1. As a result of the location of the inspection holes 18, material abraded from the brake linings by wear is simultaneously removed from the brake hub 2 during the scavenging.

A cast spoke-wheel of the described construction may be advantageously used in a motorcycle as rear wheel because an effective cooling of the rear-wheel brake can be achieved therewith. However, the arrangement of air feed devices is also not limited to radially extending spokes. Furthermore, the air feed devices may also be arranged between webs which reinforce spokes in the axial direction and continue as ribs on the end wall of a brake hub.

Finally, channels also extending in the radial direction are feasible within the scope of the present invention as air feed devices. These channels are realized, for example, with spokes extending radially within the area of the end wall of a brake hub in that adjacent spokes are operatively connected respectively by way of a cover wall arranged at a distance to the end wall. The thus-formed channel may be open on the side of the wheel hub as also on the side of the rim. This construction serves for the external ventilation of a brake hub. For achieving an internal ventilation of the brake hub, the channel is in communication in an air-conducting manner by way of an aperture provided in the end wall.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A cast spoked wheel for motor vehicles which comprises a brake hub means connected with a wheel hub means by way of an end wall means and radially directed spoke means arranged extending over the end wall means to a rim, dividing the wheel into a plurality of sectors, characterized in that at least in one of the sectors an inclined blade means which projects with its respective forward edge pointing respectively in the direction of rotation of the spoked wheel, in the axial direction beyond the spoke means is connected by way of its respective rear edge with an adjacent spoke means and on the side of the wheel rim with a respective wall each extending from one spoke means to the adjacent spoke means and connected with the end wall means to form an air-collecting scoop case integrally with said spoke means and said end wall means and having a passage therethrough for supplying ventilating air through the end wall means to the interior of the brake hub means.

2. A spoked wheel according to claim 1, characterized in that an aperture means is provided for enabling outward flow of air supplied to the brake hub by the air-collecting scoop and for serving as an inspection hole permitting inspection of a brake ring in the brake hub, said aperture means being arranged in sectors alternating with the sectors in which the inclined blade means are located.

* * * * *